April 30, 1940.  R. A. GALE  2,199,071
TEMPERATURE CONTROL APPARATUS
Filed March 13, 1939   2 Sheets-Sheet 1
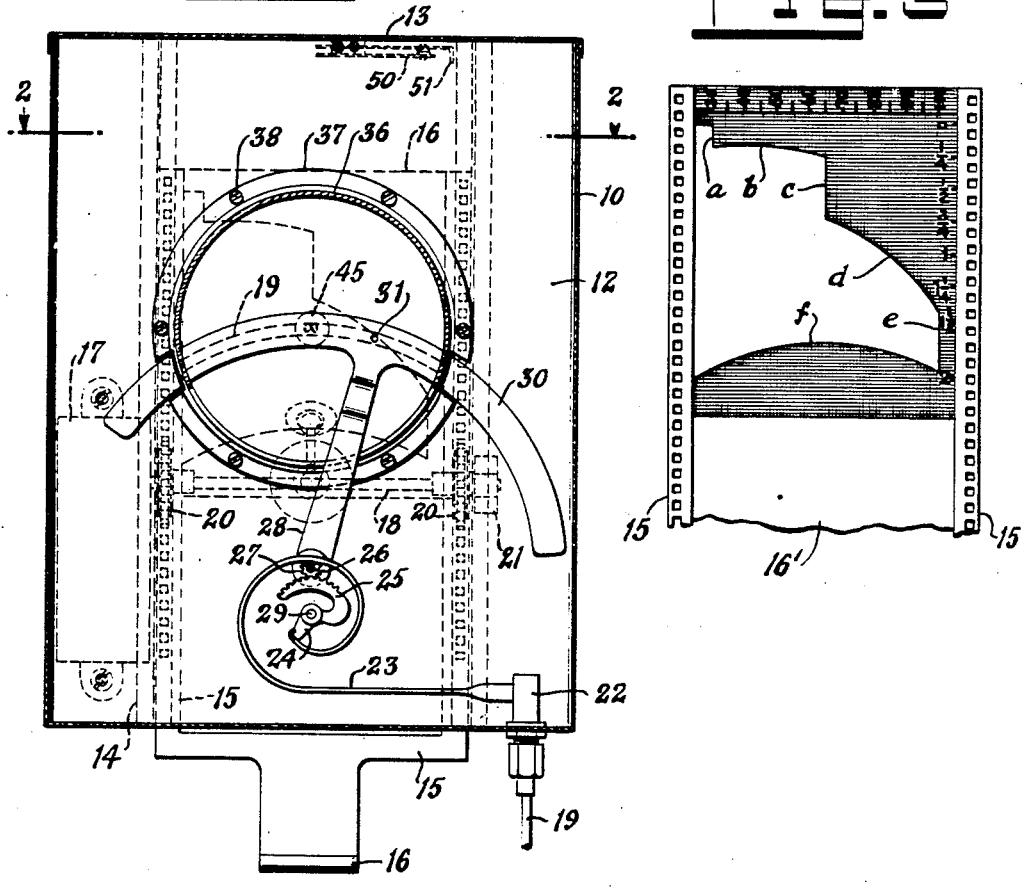
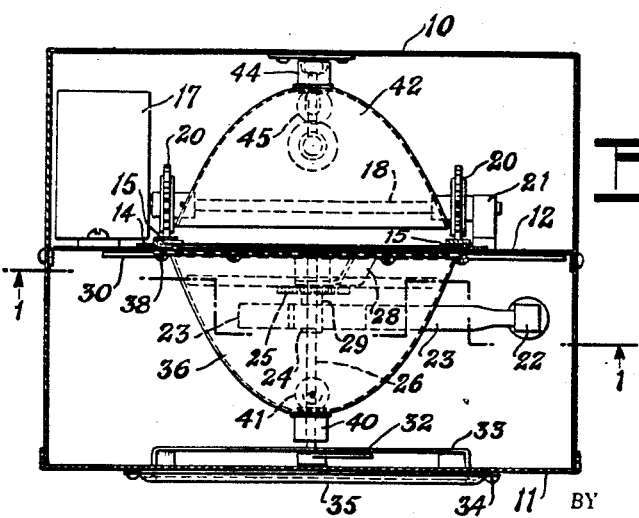
INVENTOR.
Rowland A. Gale
Darby & Darby
ATTORNEYS April 30, 1940.                R. A. GALE                2,199,071
                      TEMPERATURE CONTROL APPARATUS
              Filed March 13, 1939          2 Sheets-Sheet 2
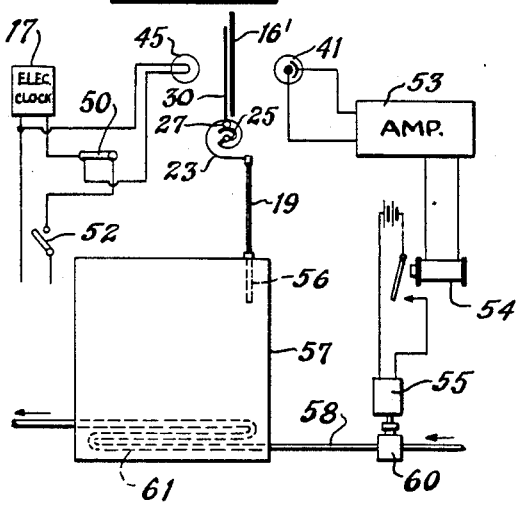
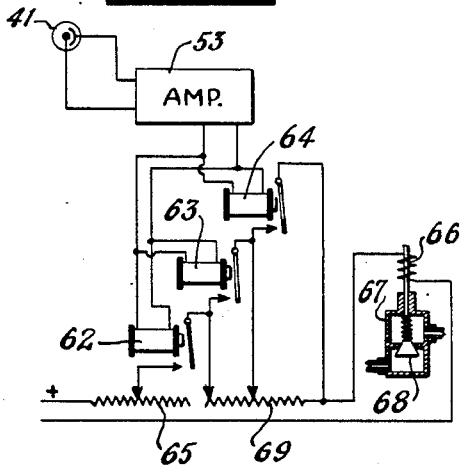
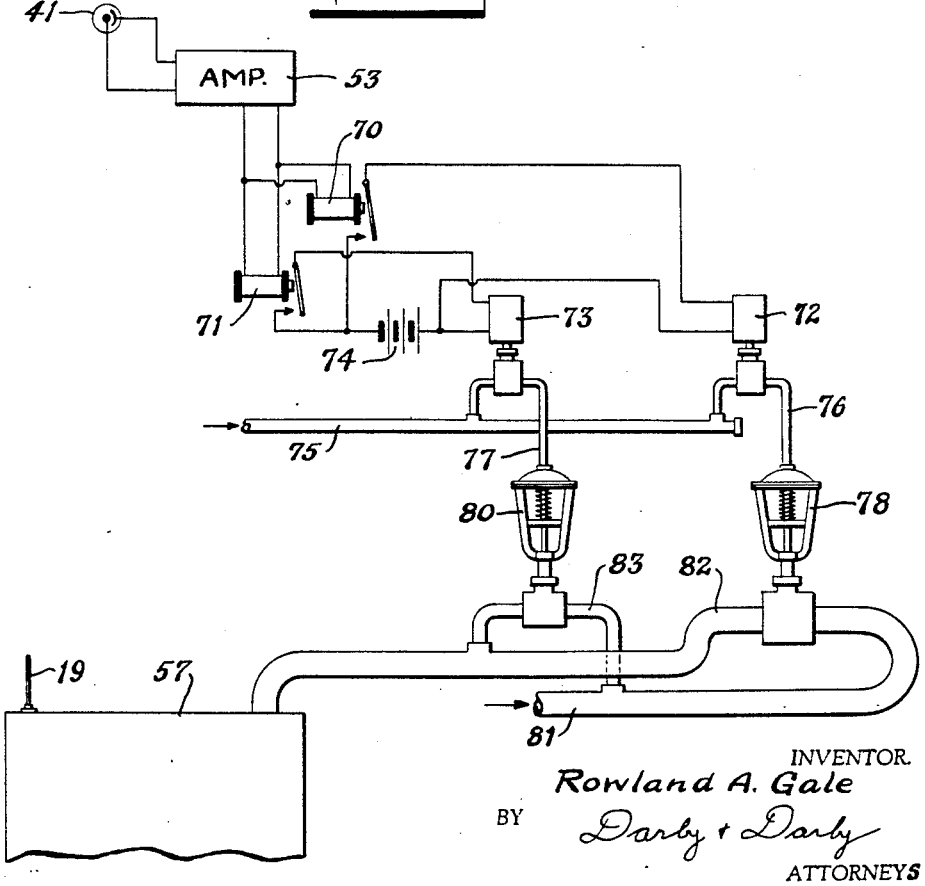
INVENTOR.
Rowland A. Gale
BY Darby & Darby
ATTORNEYS Patented Apr. 30, 1940

2,199,071

UNITED STATES PATENT OFFICE 2,199,071

TEMPERATURE CONTROL APPARATUS

Rowland A. Gale, New York, N. Y.

Application March 13, 1939, Serial No. 261,513

11 Claims. (Cl. 250—41.5)

The present invention relates to temperature control apparatus and particularly to apparatus for controlling the temperature of a material being processed throughout a period of time.

Past apparatus having the same general objects as expressed above usually comprised cam means for controlling the temperature, these cams being made to represent a time temperature curve. Such cams were inefficient and, in many instances, inoperable because of the fact that when the temperature curve was steep the cam follower would tend to jam against the cam. Moreover, each time that the temperature curve was altered a new cam had to be made, and this involved considerable expense as well as a waste of time.

In the present invention I utilize a time temperature chart which comprises a curve plotted in accordance with the desired time temperature variations, the area on one side of the curve being opaque and that on the other side transparent. A light sensitive device, such as a photo-electric cell or tube, is provided and is mounted in the path of a beam of light in such manner that it together with a light shutter controlled by temperature responsive devices causes variation in the cell energization and thus serves to vary the supply of steam or other heating medium to the material to be processed, as for example to a processing tank or to a chamber such as a hothouse.

An object of my invention is to provide means for governing the heating cycle of a material to be processed in accordance with a predetermined time temperature curve.

Another object of the invention is to utilize a photoelectric cell and light beam as a means of following a time temperature curve such as described above and of controlling the flow of heating or cooling medium to a processing tank or chamber in accordance with that curve.

A further object of my invention is to provide apparatus such that the ordinary workman may readily substitute one curve for another.

A still further object of my invention is to provide an apparatus such that the time temperature curve used may be prepared by the ordinary workman without special training.

Further objects and features of the invention will appear when the following description is considered in connection with the appended drawings, in which Figure 1 is a vertical, cross-sectional view of the apparatus taken on planes indicated by line 1—1 of Figure 2;

Figure 2 is a horizontal cross-sectional view of the apparatus taken on the plane of the line 2—2 of Figure 1;

Figure 3 is a fragmentary view showing a particular time and temperature curve as arranged for use in this apparatus. This view shows the curve in place in a frame in which it is placed in the device;

Figure 4 is a diagrammatic view showing the use of the apparatus of Figures 1, 2 and 3 in connection with a particular form of heat flow control apparatus;

Figure 5 is a schematic view showing a different form of apparatus for controlling the heat flow through the medium of the apparatus of Figures 1, 2 and 3; and Figure 6 is a still different form of apparatus for controlling the heat flow in accordance with the time temperature curve, utilizing the apparatus of Figures 1, 2 and 3.

The apparatus of this invention is housed in a rectangular cabinet 10 having a removable front plate 11 and an interior partition 12 as well as a removable top 13. Mounted on the rear of the partition 12 are two Z-shaped bars 14 which are spaced apart and form guideways for the U-shaped frame 15, which frame is made of channel members providing slots in which the transparent sheet carrying the time temperature curve may be inserted. Integral with the frame 15 at the lower portion is a handle 16 which is used in inserting the frame and chart in the apparatus.

The bars 14 are slotted at points slightly below their centers in order that sprocket wheels 20 may project through the bars and cooperate with the sprocket holes in the frame members 15, see Figure 3. These sprocket wheels 20 are mounted on a shaft 18 which is supported in bearings 21 fixed to the partition 12. The shaft 18 is driven by the hour hand shaft of an electric clock 17, which clock is fastened to partition 12, as shown in Figure 2. The electric clock 17 is shown merely as an example, it being obvious that a spring clock might be substituted and wound by positioning the frame 15 at starting position.

The temperature responsive mechanism of the apparatus may be of any desired type; that which is shown comprises a tube leading from a thermometric element in the receptacle in which the material being processed is located to the coupling 22 and thence to Bourdon tube 23. This Bourdon tube is attached at its further end to an arm 24 integral with a curved rack 25 which is fixed to a shaft 29, which shaft is a stub shaft supported at its inner end in the partition member 12. Also, the rack 29 is offset slightly to the rear of the arm 24 to cooperate with a pinion 27 mounted on shaft 26. Shaft 26 extends from the partition member 12 to the cover plate 11. It is to be noted that the front plate may be removed by simply slipping the bearing therein over the shaft 26 so that the interior of the apparatus may be inspected. The entire mechanism may then be removed from the cabinet by unfastening the coupling 22 and removing partition 12 from the cabinet.

Fixed to the shaft 26 is a bent arm 28 which carries an arcuate shutter plate 30 at its outer end. The plate 30 lies in front of a slit 19 (Figure 1) in the partition 12 and has a light aperture 31 therein. This aperture may be of any desirable size, the size depending somewhat on whether the process is one which requires simply open and shut conditions of the controlling valve or one which requires these conditions as well as intermediate ones.

A pointer 32 is fixed to the forward end of the shaft 26 and cooperates with a dial 33 fastened to the front plate 11. The front plate 11 is cut out in the area lying in front of the dial 33 and a glass 34 is supplied, this glass being fastened to the plate 11 through the medium of the bezel 35.

Mounted on the forward side of the partition 12 is a parabolic reflector 36, the mounting being carried out by means of screws 38 passing through the flange 37 of the reflector. At the apex of the reflector is a socket 40 in which a photoelectric cell 41 is placed in such manner that its light sensitive element lies at the focal point of the reflector. It should be noted that the reflector 36 has a slot in its lower portion to permit oscillation of the arm 28 and likewise has a pair of slots in the flange 37 to permit passage of the shutter member 30. Obviously, the reflector might be otherwise supported, as on the front plate 11 with its rim removed from partition 12, thus making the slots unnecessary.

A similar parabolic reflector 42 is mounted at the rear of the partition member 12 but is slightly spaced therefrom in order that the chart 16' may move in the Z-shaped bars 14. This reflector is fastened to the cabinet 10 in any suitable manner as by the ball and socket mounted of Figure 2. Mounted at the apex of this reflector is a socket 44 in which is placed a light source 45, the filament of which lies at the focal point of this reflector.

Fixed to the top 13 of the cabinet is a pair of contacts 50, one of which has an extension 51 depending therefrom in such manner that the right hand portion of the frame member 15 will come into contact therewith and break a circuit including the contacts 50 when the frame 15 has been driven upward its full extent.

In operating the apparatus as described thus far, a chart, similar to that of Figure 3 but in accordance with the particular conditions to be met, is inserted in the frame member 15 and the frame member then inserted in the guideway formed by the Z-shaped bars 14 and raised to the starting position. At this time a switch is closed which energizes the light source 45 as well as the electric clock 17. The clock drives the frame member 15 and chart 16' upwardly. At the same time light passes through the transparent portion of the chart and the aperture 31 to the photoelectric cell 41, thus energizing the controlled member and permitting heating fluid to flow into the tank.

As the temperature rises the Bourdon tube expands and causes the shutter member 30 to move in a clockwise direction, as seen in Figure 1, until the aperture 31 lies in front of an opaque portion of the chart whereupon the light beam is interrupted and the controlling means is de-energized, causing a cessation of flow. This in turn causes the Bourdon tube to contract and to move the shutter member 30 in a counterclockwise direction until the light beam may again pass to the photoelectric cell. In this way the flow of heat medium is controlled in accordance with the temperature curve or chart.

The chart continues to rise under the drive of the electric clock 17 until such time as the right hand member of the frame 15 strikes the dependent portion 51 of the upper contact of the pair 50, whereupon these contacts are broken apart, interrupting the circuit to the light source 45 and clock 17.

In Figure 4 is shown one form of apparatus for cooperating with that described above and serving to operate a controlling means in the heat supply line. In Figure 4 the clock 17, contacts 50, light source 45, and a manually operable switch 52, as well as chart 16', light shutter 30 and temperature responsive elements 23, and 25 are shown in schematic form in order that their relation to the photoelectric cell 41 and other equipment hereinafter described may be apparent.

Connected in circuit with the photoelectric cell 41 is an amplifier 53 which may be of the vacuum tube type, the output of which supplies a relay 54. Relay 54 in turn controls the flow of current to a solenoid 55 which is the operating element of a valve 60 inserted in the heating fluid line 58 which supplies the heating coil 61 of tank 57. It will be seen that when the cell 41 is energized by a light beam from the source 45 passing through a transparent portion of chart 16' and the aperture 31 of the shutter 30, the flow of current through the cell 41 is amplified and transmitted to the relay 54. Upon closure of the contacts of relay 54 current from the battery energizes solenoid 55 of the motorized valve 60 so that heating fluid may flow through the coil 61. As the temperature rises the thermometric element 56 responds to this rise and energizes the responsive elements, including the Bourdon tube 23, which acts to move the shutter member 30, eventually interrupting the beam of light and causing closure of the valve 60.

In some processes a simple on and off control of the type described in connection with Figure 4 is not desirable. In Figure 5 there is shown an arrangement whereby my invention may be utilized to open a control valve to varying extents. In this figure the light source, chart, etc. have been omitted since they would be in the same relative positions as shown in Figure 4. In Figure 5 there are shown three relays 62, 63 and 64 having their windings connected in parallel across the output of the amplifier 53. These three relays are of the current responsive type, 62 operating on low current, 63 on somewhat higher, and 64 on still higher current.

The contacts of these relays are connected in such manner that when relay 62 is operated current is supplied through resistance 65, contacts of relay 62, and resistance 69 to solenoid 66, which then operates the valve 67, moving the cone 68 thereof away from its seat to a slight extent. When relay 63 is operated current is supplied to the solenoid 66 through resistance 65, contacts of relay 62, contacts of relay 63, and the right hand portion of resistance 69; this causes the valve 67 to be opened to a greater extent than when relay 62 is operated alone. When relay 64 is operated in addition to relays 62 and 63, current is supplied through resistance 65 and the contacts of all three relays 62, 63 and 64 to the solenoid 66, thus energizing the solenoid to the maximum possible extent and opening valve 67 to its maximum extent. This valve is in the heating fluid line in exactly the same manner as valve 60 of Figure 4 and thus controls the flow of fluid to a receptacle such as 57.

It will be seen that when this arrangement is used, as the aperture 31 moves from a transparent to an opaque area of the chart, the light beam is gradually diminished in area, this decreased amount of light tending to decrease the output of the amplifier 53 and thus deenergizing relay 64. The heat responsive elements, of course, respond to this decreased flow of heating fluid to the receptacle and if after this decrease the flow is sufficient to maintain the shutter member in position adjacent the edge of the curve the light beam remains of the same area and the relay 64 continues to be deenergized. If, however, the heating is not rapid enough to cause the aperture 31 to remain adjacent the line of division between the opaque and transparent portions of the chart the area of the light beam will increase, thus causing increased output from the amplifier 53 and energization of relay 64.

If, on the other hand, the temperature has risen to too great an extent, the area of the light beam will be further decreased and relay 63 will be deenergized, closing the valve to a greater extent and diminishing the supply of heating fluid to the tank. If this diminution of flow is still insufficient the relay 62 will be deenergized and the flow of heating fluid entirely cut off.

In Figure 6 is shown an arrangement generally similar to that of Figure 5 but varying from it in that the relays 70 and 71 thereof do not directly control the flow of heating fluid through the medium of a solenoid valve but instead operate the solenoid valves 72 and 73 which in turn cause air operation of the heating fluid control valves 78 and 80. In the arrangement of Figure 6 relays 70 and 71 are connected in parallel across the output of the amplifier 53. The contacts of these two relays are in parallel circuits including battery 74 and, respectively, solenoid valves 72 and 73. The valves 72 and 73 are supplied with air under presure by means of the pipe 75. The outlets 76 and 77 from these two valves lead respectively to the diaphragm valves 78 and 80 which are heating fluid control valves. Valve 78 is in a large heating fluid line 82 which is branched from the main supply line 81 and connected to the tank supply line 84. A smaller heating fluid line 83 leads from the main supply line 81 through valve 80 to tank supply pipe 84.

It will be seen from the above that when the photoelectric cell is energized to a maximum extent the relays 70 and 71 are closed, causing flow of current to the two solenoids 72 and 73, and due to the flow of compressed air through these valves causing operation of the diaphragm valves 78 and 80 to permit passage of the full amount of heating fluid to the tank 57. If, however, the aperture 31 only partially overlies a transparent area of the chart, the relay 71 will alone receive enough current to operate it and thus valve 80 will alone be operated, thus supplying a smaller amount of heating fluid to the tank.

In order that the mode of operation of the device may be clear, the operation thereof throughout a typical cycle will now be described. In this description the apparatus of Figure 6 will be considered and the time-temperature chart 16' of Figure 3 will be considered to be the chart which represents the desired cycle.

The chart is placed in the frame 15, raised to the starting position and switch 52 closed. As will be seen, the time temperature curve for the first period of time (15 minutes) is a vertical line at the 30° position as indicated by Figure 3. It is assumed for the purposes of this discussion that the tank 57 and material to be processed has been brought to or nearly to this temperature by any suitable means, as for example by manually operating valves 78 and 80.

The aperture 31 of shutter 30 thus lies at or near the 30° line of the chart when the chart starts to move. For purposes of description it will be assumed that the aperture is just to the left of the line of delineation between the transparent and opaque areas. Immediately after the initiation of operation of the device the shutter will move in a clockwise direction so that the apperture 31 partially overlies an opaque area of the chart. This occurrence diminishes the area of the light beam passing to the photoelectric cell 41 and consequently causes a decreased output from an amplifier 53.

As a result of this, relay 70 (which together with relay 71 has been energized as explained hereinbefore) is deenergized thus causing closure of the valve 78 and reduction of the flow of heating fluid to the tank 57. If the supply line 83 is of correct size to just balance the heat losses of the system the aperture 31 will remain in its position until the time temperature curve departs from the vertical. If this line 83 can supply more than enough heating fluid to balance the losses the aperture will move further in a clockwise direction and cause complete interruption of light to the cell 41 and thus deenergize relay 71 as well as 70, causing valve 80 to close and the heating fluid to be completely shut off.

If, however, the line 83 does not permit sufficient flow to balance the losses the shutter plate 30 and its aperture 31 will move in a counter-clockwise direction and increase the area of the light beam, thus causing relay 70 to be energized and valve 78 to be opened, thus permitting full flow of heating medium to the tank.

In any event, the aperture 31, for the fifteen minute period at which the temperature is to be 30°, either lies on the line of demarkation between the opaque and transparent areas of the chart or oscillates slightly about that position.

During the next fifteen minute period the chart indicates a rise in temperature to 65° over the portion designated b. During the first part of this period the aperture will lie in front of a transparent area of the chart and thereafter heating fluid will be admitted to the tank 57 under control of valves 78 and 80 or 78 alone depending on the gradient of the chart curve with respect to the rate of movement of the shutter plate.

During the succeeding half hour interval the temperature remains constant at 65° as shown by portion c of the chart. The operation during this period is of course similar to that during the first fifteen minute period.

In the next half hour period the temperature will gradually rise from 65° to 100° as shown by portion $d$, the relative positions of the line of demarcation between the opaque and transparent areas and of the aperture 31 governing the valve openings as before.

During the next half hour interval the temperature will remain constant at 100° since that portion of the curve, designated $e$, is a vertical line.

As was stated above, a chart in accordance with any desired time-temperature conditions may be easily prepared. A scale of the length of the entire time period represented by the chart may be used and by placing the end of this scale upon the portion $f$ (printed on the chart) on a vertical line representing the temperature desired the time at which this temperature is to be reached may be plotted by simply laying off the representative distance from the top downwardly as marked on the scale. After the curve has been drawn the area outside thereof is rendered opaque. Another and possibly simpler mode of preparing such a chart is to provide graph sheets having the coordinates printed thereon (in this case with one coordinate of arcuate form) on which the curve is laid off, the sheets being opaque so that the area on one side of the curve may be cut out to render the chart transparent.

The above description is for a single example of my mechanism only and is, therefore, not to be regarded as limiting the scope of my invention. It will be obvious that many variations are possible, for example the time temperature curve might be plotted in rectangular coordinates and the shutter plate 30 caused to reciprocate rather than to oscillate as here shown. Also, either the photoelectric cell or light source might be mounted to move with the shutter plate 30 and the reflector 36 eliminated. Again the chart may be of much greater length than that shown, and may be made of flexible material.

Moreover, it is to be understood that the transparent and opaque areas may be interchanged since it is the line of demarcation of these areas which controls the operation rather than the areas themselves. The opaque and transparent areas may also be replaced by reflecting and non-reflecting areas, the mechanism being conformed thereto, as is readily understood.

The various circuit and valve arrangements of Figures 4, 5 and 6 are likewise illustrative only. Many other arrangements might be utilized with my invention, among which may be mentioned a pneumatic control couple of the supply and waste type operated by the current from the photoelectric cell through the medium of magnetic or other suitable means, and the use of a power tube having straight line characteristics such that its output varies in direct relationship to the input as governed by varying light intensity, the output from the tube being applied to a solenoid, the armature of which operates a crank attached to a valve of the flow control type.

It will be apparent that while the device of my invention has been described particularly as a time temperature control, other variables may be controlled in like manner. One example of such other variables is the control of acidity (pH) of a material.

What is claimed is:

1. In a device for controlling one variable with respect to another the combination of a light source, a photoelectric cell, a chart comprising a curve of the first variable with respect to the second, the area outside the curve being transparent and that within opaque, interposed between said light source and said cell, a light shutter likewise interposed between said source and said cell, means to move said chart in one direction in accordance with the variations of one of said variables, and means to move said light shutter in a substantially perpendicular direction in accordance with the rate of variation in the second variable.

2. In a device for controlling one variable with respect to another, the combination of a light source, a photoelectric cell, means interposed between said source and said cell for defining a band of light, a chart comprising a curve representing the desired variations of the one variable with respect to the other and having the area outside the curve transparent and that within the curve opaque, said chart being interposed between said light source and said cell, to limit the extent of said band of light, means to move said chart in one direction in accordance with the variation of one of said variables to vary the limit of said band of light, and a light shutter interposed between said source and said cell, said shutter being moved in a direction substantially perpendicular to that of said chart in accordance with variations in said other variable to restrict said limited band of light to a point or to interrupt said light completely whereby the photoelectric cell is energized or de-energized in accordance with the relationship between the said two variables.

3. In a device for controlling one variable with respect to another, the combination of a light source, a photoelectric cell, a chart of the variables interposed between said light source and said cell, a light shutter also interposed between said light source and said cell, said shutter being operated by devices responsive to changes in condition of one of the variables, and means under control of said cell for governing the application of condition changing material to said responsive devices.

4. In a device for controlling one variable with respect to another, a receptacle for material to be subjected to action of one of said variables, a source of supply of said variables for said receptacle, a light source, a photoelectric cell, a chart of one variable with respect to the other, said chart having transparent and opaque areas interposed between said light source and said photoelectric cell, a shutter likewise interposed between said source and said cell, devices responsive to the conditions in said receptacle for controlling the position of said shutter and means responsive to the energization of said cell as governed by the said chart and shutter for controlling the flow of said first variable from said source to said receptacle.

5. In a device for controlling one variable with respect to another, in combination a photoelectric cell, a light source, a chart of said variables interposed between said light and said cell, a receptacle for material to be processed, devices responsive to one of said variables located in said receptacle, and means controlled by said responsive devices cooperating with said chart for varying the amount of light passing from said source to said cell.

6. In a device for controlling one variable with respect to another, in combination, a photoelectric cell, a source of light, means for restricting the light directed toward said cell to a narrow band, means for variably limiting the length of said band in accordance with a curve of the first variable with respect to the second to be followed, means comprising a shutter having an aperture therein for further limiting said light from zero to a maximum in accordance with the position of said aperture with respect to one limit of said band whereby said cell is energized varying amounts, and means for operating said shutter in accordance with the variations in the first variable.

7. In a device for controlling one variable with respect to another, in combination, a light sensitive device, a source of light, means for restricting the light directed toward said cell to a narrow band, means for variably limiting the length of said band in accordance with a curve of said variables, means comprising a plate having an aperture therein for further limiting said light, said plate being movable and lying adjacent the end of said band of light on either side thereof to vary the amount of light passing to said light sensitive device from zero to the maximum of said aperture, and means under control of devices responsive to the condition of the variable under control for moving said plate.

8. In a device for controlling the variation of one variable with respect to another, the combination of a light source, a photoelectric cell, means to restrict the light passing from said source toward said cell to a narrow band, means comprising a partly transparent movable chart for variably limiting the length of said band, and means for restricting the passage of light from said band to said cell to a pencil, said last mentioned means being operated in accordance with the rate of variation of the variable under control.

9. In a device for controlling the variation of a variable with respect to a second constantly varying variable the combination of a light source, a photoelectric cell, means to restrict the light passing from said source to said cell to a narrow band, a movable chart comprising a curve of the first variable with respect to the second drawn on a transparent sheet with the area on one side of the curve rendered opaque, means for moving said chart across said band of light at a definite rate to vary the effective length of said band in accordance with desired variations of the first variable, means comprising a shutter interposed between said band and said cell for limiting light transmission to a pencil, a receptacle for material to be acted upon by said first or controlled variable, means for controlling the flow of means influencing said first variable to said receptacle, said controlling means being operable by said cell, and means responsive to changes in first said variable in said receptacle for controlling the positions of said shutter with respect to the limit of said band whereby said pencil of light is varied from its full extent to zero to vary the energization of said cell.

10. The method of interpreting a chart comprising a curve of one variable with respect to another with the area on one side of the curve opaque and that on the other side transparent, which comprises; interposing said chart between a light source having a field extending in the direction of the ordinate of one variable, and a light sensitive device; moving said chart across said field in the direction of the other variable at a constant rate and governing the flow of light conjointly by said chart and by a shutter responsive to variations in the second variable.

11. In a device for controlling the variation of one variable with respect to another, the combination of a light source, a photoelectric cell, means to restrict the light passing from said source to said cell to a pencil, means comprising a partly transparent movable chart for varying the area of said pencil of light, and means carrying said light source and said cell and movable in a path substantially perpendicular to that of said chart, said last-mentioned means being operated in accordance with the rate of variation of the variable under control.

ROWLAND A. GALE.